United States Patent [19]
Willens

[11] Patent Number: 5,889,958
[45] Date of Patent: Mar. 30, 1999

[54] NETWORK ACCESS CONTROL SYSTEM AND PROCESS

[75] Inventor: Steven M. Willens, Pleasanton, Calif.

[73] Assignee: Livingston Enterprises, Inc., Pleasanton, Calif.

[21] Appl. No.: 771,637

[22] Filed: Dec. 20, 1996

[51] Int. Cl.$^6$ ..................................................... G06F 11/00
[52] U.S. Cl. ............................... 395/200.59; 395/187.01
[58] Field of Search .......................... 395/187.01, 200.59

[56] References Cited

U.S. PATENT DOCUMENTS

| | | | |
|---|---|---|---|
| 5,560,008 | 9/1996 | Johnson et al. | 395/650 |
| 5,606,668 | 2/1997 | Shewd | 395/200.11 |
| 5,649,099 | 7/1997 | Theimer et al. | 395/187.01 |
| 5,677,851 | 10/1997 | Kingdon et al. | 364/514 C |
| 5,689,638 | 11/1997 | Sadovsky | 395/188.01 |
| 5,689,642 | 11/1997 | Harkins et al. | 395/200.04 |
| 5,689,708 | 11/1997 | Regnier et al. | 395/682 |
| 5,696,898 | 12/1997 | Baker et al. | 395/187.01 |
| 5,708,780 | 1/1998 | Levergood et al. | 395/200.12 |

OTHER PUBLICATIONS

Chapman, D. Brent et al., *Building Internet Firewalls*, O'Reilly & Associated, Inc., 1995 (Editor Deborah Russell) Table of Contents, Chapter 6 and Appendix C attached.
SurfWatch Software, Inc. "Sexually explicit material is on the Internet", 1995.

*Primary Examiner*—Lance Leonard Barry
*Attorney, Agent, or Firm*—Sterne, Kessler, Goldstein & Fox, P.L.L.C

[57] ABSTRACT

An Internet access system (10) incorporates an access control subsystem (12), implemented with a communications server (14), one or more Remote Authentication Dial In User Service (RADIUS) servers (16), and a remote access server (18) in network 21. Users are connected to the network by dial-up connections (22) through the communications server (14). When user (22) logs in through the communications server (14), RADIUS client software (45) first determines if user (22) is authorized by checking his password utilizing user profiles (46). The user profiles (46) also identify a filter "F(Timmy)". The RADIUS server (16) supplies the filter identification through the RADIUS client (45) for use by client software (44) for controlling access by the user (22) to Internet sites. The client software (44) then checks to see if the filter "F(Timmy)" is stored locally in cache (50). If it is, the client software (44) uses it for controlling access. If not, the client software (44) sends a lookup request to the network access server (18), which stores the centralized permitted site list and the filters to be used as masks for checking access classifications of requested sites, to download the filter "F(Timmy)", which is maintained in the server (14) memory for the rest of the user (22)'s session. The client (44) also keeps the local cache (50 of recently requested sites and recently used user filters for efficiency. When access to a site is requested, the client first checks the local cache (50) to see if the site is on the list stored there. In practice, the client software (44) and permit-based filtering technology is integrated in the communications operating system software that runs on the server (14) or routers (24), (32) or (34).

23 Claims, 5 Drawing Sheets

NETWORK ACCESS CONTROL SYSTEM AND PROCESS

BACKGROUND OF THE INVENTION

1. Field of the Invention

The present invention relates generally to a centralized, server, based approach to Internet and similar computer network of networks content monitoring and user authorization. More particularly, it relates to a system and process which uses dynamically down-loadable user specific filters from a central server for content monitoring and user authorization in a network of networks.

2. Description of the Prior Art

Much press has been made in recent months over public desire for restricting access to indecent text and graphics on the Internet. Parents and schools have raised legitimate concerns about the ease with which children can gain exposure to pornographic, violent, racist and other indecent materials, especially in graphical forms found on the fast expanding World Wide Web (WWW). Most recently, the Telecommunications Reform Act signed by President Clinton legislates Internet censorship and stiff punitive measures to enforce these desires. However, most users and advocates of the Internet agree that such government regulation is not the answer. The upshot of this groundswell has been the overnight development of a marketplace for products that empower parents, schools and corporations to choose the Internet content that children, students and employees experience. Proposals for voluntary ratings on Internet sites are also in progress and are being actively added to legislation.

While first generation Internet content monitoring products represent a good first step, they only offer a partial answer, and one that has many shortcomings. The first generation of Internet content monitoring products arose from existing technology which monitored the use of local software on a Personal Computer ("PC") for indecent or violent content based on keyword lists. These products were extended to monitor hostnames, Uniform Resource Locators ("URLs") and other Internet content that appeared on the PC using these keyword lists. For example, the keyword lists commonly distributed with these products include general words like "erotic", "sex" and "xxx", and sometimes specific hostnames, like "playboy.com". The principle behind these lists is to deny access to sites, URLs, or any document that contains these keywords. So, if the user of the PC typed "playboy.com" in his browser screen to go to that site, the software would actively deny access and stop the browser from going to that site, or at least log the instances of keyword violations for later review by an authorized administrator, such as a parent or teacher.

There are a number of reasons why this approach is ill suited to the Internet.

1. Deny keyword lists lag behind the growth of the Internet.

The Internet is growing too fast and is too smart to be bottled up by keyword lists. To begin with, updates of keyword lists lag behind the actual creation and appearance of "bad" sites on the World Wide Web. Some products only update their lists once a month as part of a subscription service. Most don't allow parents and teachers to customize the lists themselves. Others don't provide any update service at all. All of these factors mean that there will be large holes in the protective screen that these products intend to cast over Internet content.

2. "Bad" words must be used to be caught by deny keyword lists.

Denial of service keyword lists depend on the use of "obscene" language at Internet sites in order to screen them. Once the creators of Internet sites catch on to this, more and more "obscene" sites will use "innocent" words to thwart the keywords, thus diminishing the efficiency of deny keywords lists steadily over time. An example would be the site called www.candyland.com. Although it has a neutral name, it is an adult site. A keyword list could not catch and deny all of these sites without denying thousands of innocent sites by extension.

3. No restrictions on indexes and search engines.

Deny-based approaches do not restrict the index and search tools that users access. Ironically, one of the most powerful tools for breaking through the protective screen of deny-based monitors are the very indexes and search tools that practically all Internet surfers use for free to find information on the World Wide Web. These indexes can search all the available sites, both the good and the bad, so it is very easy to find indecent sites that do not get denied by the keyword lists.

4. PC-based content monitors can be easily tampered with.

Most children who use the Internet are far more sophisticated users than the parents and teachers who are trying to restrict their access to questionable content on the Internet. It is possible that children will be able to hack around a PC-based solution without a parent's or teacher's knowledge.

5. Distributed PC-based content monitors are administratively cumbersome.

For parents to use these products effectively, there must be constant monitoring, either to find new sites that are not being caught by current keywords or to send in requests to the software manufacturer for additions to the deny list. Internet marketing studies show that the typical parents who provide Internet access to their children are in a demographic that is already challenged for time by career pressures. It is unlikely that these parents will have the time, expertise or energy to learn to maintain and monitor their child's home PC. This administrative overhead is worse for schools that are considering implementing these solutions on every PC and Macintosh in a school district.

6. Distributed PC-based content monitors require a PC.

The new generation of Internet terminals, which have no hard disk to store programs, will not be able to run this type of client software and retrieve list updates.

SUMMARY OF THE INVENTION

Accordingly, it is an object of this invention to provide a system and process for network access control that allows customized Internet content monitoring based on a centralized permit model.

It is another object of the invention to provide such a system and process which is readily implemented using hardware that is typically present in most installations for Internet access.

It is a further object of the invention to provide such a system and process that utilizes an extension of firewall filtering to implement the content monitoring.

The attainment of these and related objects may be achieved through use of the novel network access control system and process herein disclosed. A network access control system in accordance with this invention has a local access server with a local cache for storage of recently used user filters and sites accessible from the system for which access has been requested. A network access server is coupled to the local access server and has storage for user filters. Access client software resident in the local access server uses the user filters and sites for which access has been requested in the local cache for making an access determination for a site to which a user requests access and communicates with the network access server to obtain an access determination from the user filters and site lists stored at the network access server if an access determination cannot be made from the user filters and sites stored in the local cache.

In another aspect of the invention, a process controls network access in a system of interconnected networks by defining user access filters for determining if a request by a user for access to a desired site in the system should be permitted. Recently used user access filters and sites accessible from the system for which access has been requested are stored in a local cache of a local access server. User filters and site lists are stored at a network access server coupled to the local access server. An attempt is made to use the user filters and sites for which access has been requested in the local cache for making an access determination for a site to which a user requests access. At least one of the user filters and site lists stored at said network access server is used to obtain an access determination if an access determination cannot be made from the user filters and sites stored in said local cache. In a further aspect of the invention, a storage medium has stored therein a program, which when executed on a networked data processing system, will carry out the above process.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
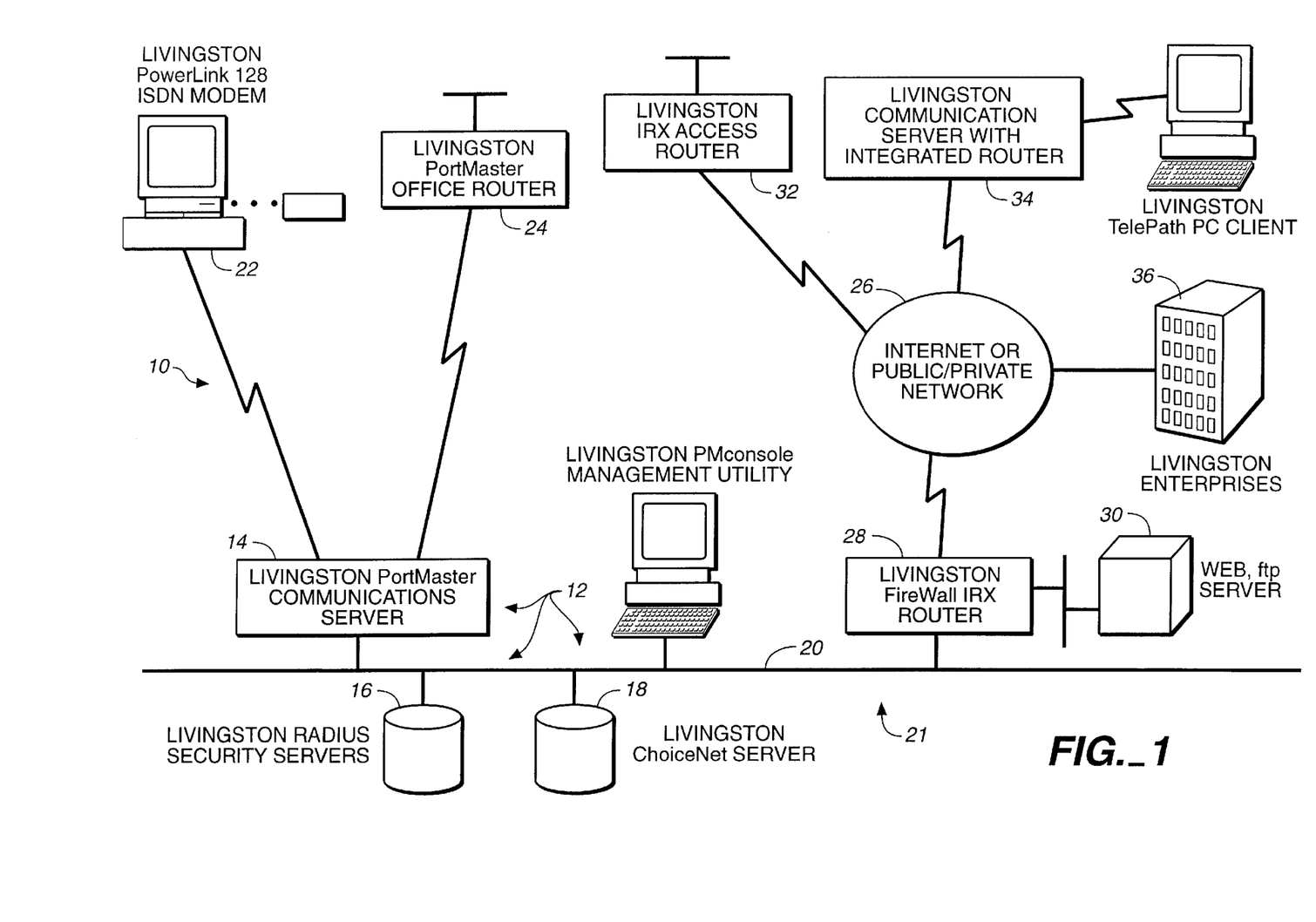
FIG. 1 is a block diagram of an Internet access system employing the invention.

Turning now to the drawings, more particularly to FIG. 1, there is shown an Internet access system 10 which incorporates an access control 10 subsystem 12 of this invention. The access control subsystem 12 is implemented with a communications server 14, one or more Remote Authentication Dial In User Service (RADIUS) servers 16, and a remote access server 18, all connected to a network backbone 20. In the network 21 connected by backbone 20, users are connected to the network by dial-up connections 22 through the communications server 14 or via a local area network (LAN) router 24, also through the communications server 14.

The network 21 connected to backbone 20 is connected to the Internet or other public/private network 26 through a firewall router 28. A World Wide Web (WWW) and File Transmission Protocol (FTP) server 30 for the network connected by backbone 20 is also separately connected to the Internet 26 through the firewall router 28 for security of the rest of network 21 from outsiders accessing the web and ftp sites of the network 21. Various other heterogenous sites 32, 34 and 36 are also connected to the Internet 26. In addition to serving as part of the access control subsystem 12 for the network 21, the access control server 18 also serves as a central access control server for the other sites 32, 34 and 36 shown in FIG. 1, as will be explained in further detail below. By way of example, the network 21 might represent an Internet Service Provider (ISP).

Figure 2:
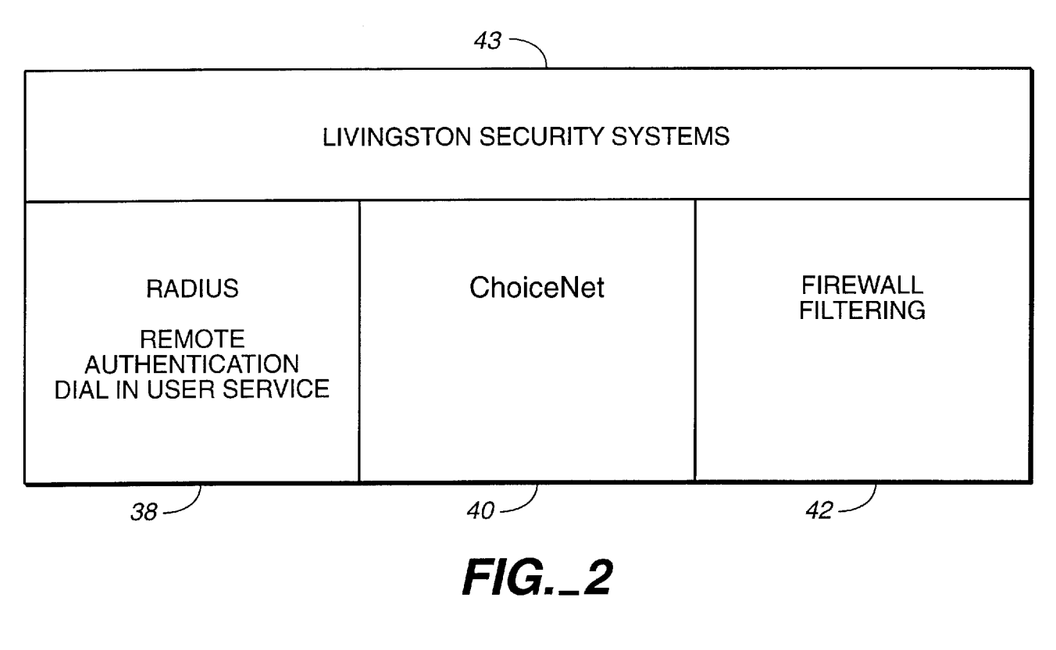
FIG. 2 is a block diagram of a first portion of the system shown in FIG. 1.

As represented in FIG. 2, the access control subsystem 12 incorporates integrated software modules 38, 40 and 42, respectively comprising the RADIUS module, the network access module, and the firewall filtering module in security systems software 43. Because the network access module 40 works with the RADIUS module 38 and the firewall filtering module 42, the network access system and process of this invention can be implemented with hardware resources otherwise present on a network. Although the remote access server 18 is shown as part of the network 21, many sites 32, 34 and 36 utilizing it in the system and process of this invention will access it remotely through the Internet 26. Alternatively, the routers 24, 32, 34 can be part of networks having their own network access server 18.

The remote access control subsystem 12 allows ISPs and Internet connected organizations easily to build content monitored Internet access for children using the power of a centralized, permit based approach. Instead of vainly trying to catch all the "bad" sites on the Internet, the ChoiceNet remote access control subsystem 12 applies the reverse logic by permitting access only to content approved "good" sites. All communications initiated by the user to sites that are on the permit list are allowed, while access to all other sites is denied by default. Instead of distributing the content monitoring technology to every desktop PC and Macintosh accessing the Internet, the subsystem 12 provides a centralized way to operate content monitoring using the very communications servers and routers that users' traffic travels through to get to the Internet. Finally, instead of trying to maintain an unwieldy list of deny keywords on every desktop, the subsystem 12 provides for a central, server based permit list that can be easily updated on a daily or hourly basis, and that cannot be tampered with by the end users.

In practice, the network access module 40 is provided with the server 14 and can be used to offer both content monitored "kid" Internet accounts as well as unrestricted "adult" accounts, which can dial into the same communications servers. The remote access subsystem 12 can also be used to provide content monitored Internet access from school LANs using routers 24, 32 and 34. All of the required software is provided with each server 14 or router 24, 32 and 34. Existing servers 14 or routers 24, 32 and 34 can be updated to include remote access control capability. The remote access control is fully compatible with RAIDIUS server 16.

Figure 3:
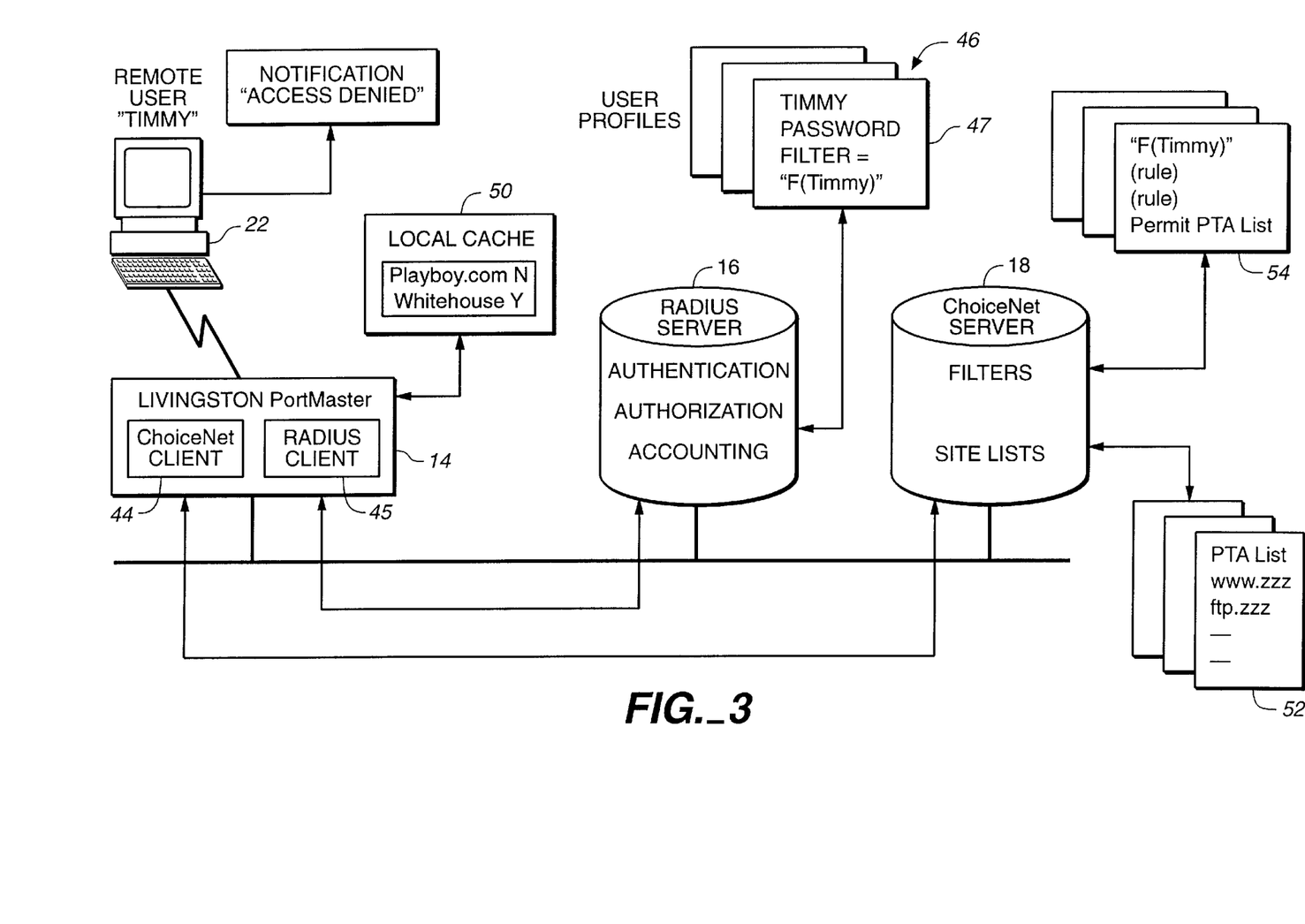
FIG. 3 is a more detailed block diagram of a second portion of the system shown in FIG. 1.

Further details of the remote access control subsystem 12 are provided in FIG. 3. Remote user 22, a child at school or at home, uses a WWW Browser and a ChoiceNet Notification Application, a Windows or Macintosh application that is installed on each PC or Macintosh accessing the Internet. This application notifies the user if a site she is attempting to access is not permitted. Disabling this notification application does not affect the functionality of the ChoiceNet network access module 40, so only the notification to the user is affected.

The ChoiceNet network access module 40 can be applied to dedicated LAN based Internet connections such as those found at schools, as well as to dial up Internet connections from home PCs, as shown in FIG. 3. Client software 44 of the module 40 can reside on a router 24, 32 or 34 (FIG. 1) as well as a communications server 14. RADIUS client software 45 is also resident on the communications server 14.

When user 22 logs in through the communications server 14, the RADIUS client software 45 first determines if user 22 is authorized by checking his password through RADIUS server 16, utilizing user profiles 46. The user profiles 46 also identify a filter "F(Timmy)" in his user profile 46. After checking user 22's authorization, the RADIUS server 16 supplies the filter identification through the RADIUS client 45 software along with the verification acknowledgment for the user 22 for use by client software 44 for controlling access by the user 22 to Internet sites. The client software 44 then checks to see if the filter "F(Timmy)" is stored locally in cache 50. If it is, the client software 44 uses it for controlling access. If not, the client software 44 sends a lookup request to the network access server 18, which stores the centralized permitted site list and the filters to be used as masks for checking access classifications of requested sites, to download the filter "F(Timmy)", which is maintained in the server 14 memory for the rest of the user 22's session. The client software 44 also keeps the local cache 50 of recently requested sites and recently used user filters for efficiency. This list includes both sites for which access was recently permitted, such as whitehouse.gov as well as sites for which access was recently denied, such as playboy.com. When access to a site is requested, the client software 44 first checks the local cache 50 to see if the site is on the list stored there. In practice, the client software 44 and permit-based filtering technology is integrated in the communications operating system software that runs on the server 14 or routers 24, 32 or 34.

Installed on one of several supported UNIX platforms, the ChoiceNet server 18 software provides lookups of sites for the server 14 or routers 24, 32 or 34 against a list of permitted sites. The server software also automatically maintains the permit list by downloading updated versions of the list over the Internet and compiling the list for use by the client software 42. As a result of this self maintenance capability, the server 18 requires minimal administrative attention.

Provided by a commercial or non-profit organization, a third party content monitored search index 52 is built specifically for content monitored access to the Internet and contains only links to sites that are acceptable for children. Children who are given content monitored access to the Internet use a search index as their sole search interface, barring them from finding other unacceptable sites. Many such children's search indexes are currently being released. This same third party search index 52 provides continuously updated versions of the permit list that resides on the server 18, corresponding to the site links on its search index tool.

In addition to the site lists, the network access control server 18 maintains a set of user filters 54 which are used to control Internet access for each user. In response to the user 22 request for access, assuming the appropriate entries are found in local cache 50, the server 14 applies the filter "F(Timmy)" 54 as a mask to the site list in the local cache to determine if the request will be granted. The server 14 looks at each filter rule found in "F(Timmy)" starting from the top. When it reaches the rule permit "PTA List", the server 14 looks into its local cache 50 to see if www.playboy.com is on the PTA List. If not, the server 14 sends a filter look-up request to the server 18. This look-up contains the list name "PTA List" and the site Timmy is trying to access (www.playboy.com). The server 18 searches list 52 and sends back the result. Based on the result, the server 14 either permits or denies access and updates it's local cache 50. In the event of denial of service, the server 14 sends a denial message back to user 22, informing him that he cannot access that site.

In practice, the access control system and process is implemented using an extension of the Internet Protocol (IP) firewall packet filtering employed by the communications server 14 for checking whether to route or drop packets to be sent and received by the network served by the communications server 14. Firewall filters are defined as an explicit set of rules based on either permit or deny syntax. The firewall filtering of server 14 provides bidirectional (input/output) packet filtering for source and destination addresses, for protocol (Transport Layer Protocol("TCP"), User Datagram Protocol ("UDP"), IP, Internetwork Packet Exchange ("IPX") and port (Hypertext Transport Protocol ("http"), etc.). With an unlimited number of rules in each filter, today's filtering technology can quickly become an administrative burden due to all filters residing in each server 14 or router 24, 32 or 34 scattered throughout a network. The access control module 40 removes the administrative burden of filter list management by centralizing filters and filter lists in a single server 18 on the network 21.

When a request for access is made by the user for which a determination cannot be made using the local cache 50, the server 14 drops the packet making the request to allow time for access and response from the server 18. Since drops are common on the Internet, the packet making the request is retransmitted a number of times before the request times out, typically at 30 seconds or so. The source and destination addresses in the header packet are used to identify the user, allowing selection of the appropriate user filter, and to identify the site for which the user desires access. An example source address identifying a user might be:

192.168.51.50

An example destination address identifying a site requested by the user might be:

172.16.3.4

The server 14 uses such addresses in packet headers for making decisions on the handing of IP packets, such as for firewall security. Little additional overhead at the server is required to use these addresses for the purposes of identifying user filters and sites for determining site access in this system and process. If a particular source address represents a node that is associated with a single user who has no access restriction, then no further checking is required and no user filter need be employed. If multiple users are associated with a particular address node, then login information is used to determine which user filter should be applied for access requests.

Further details on the use of Internet IP addresses in the context of packet filtering, which are helpful for a more complete understanding of the invention, are available in Chapman, Brent, "Network (In)security Through IP Packet Filtering," 1992 UNIX Security Symposium III Proceedings, p. 63–76 and in Chapman and Zwicky, *Building Internet Firewalls*, Sebastopol, Calif., O'Reilly & Associates, 1995, particularly chapter 6 and Appendix C, the disclosures of which are hereby incorporated by reference herein.

Figure 4:
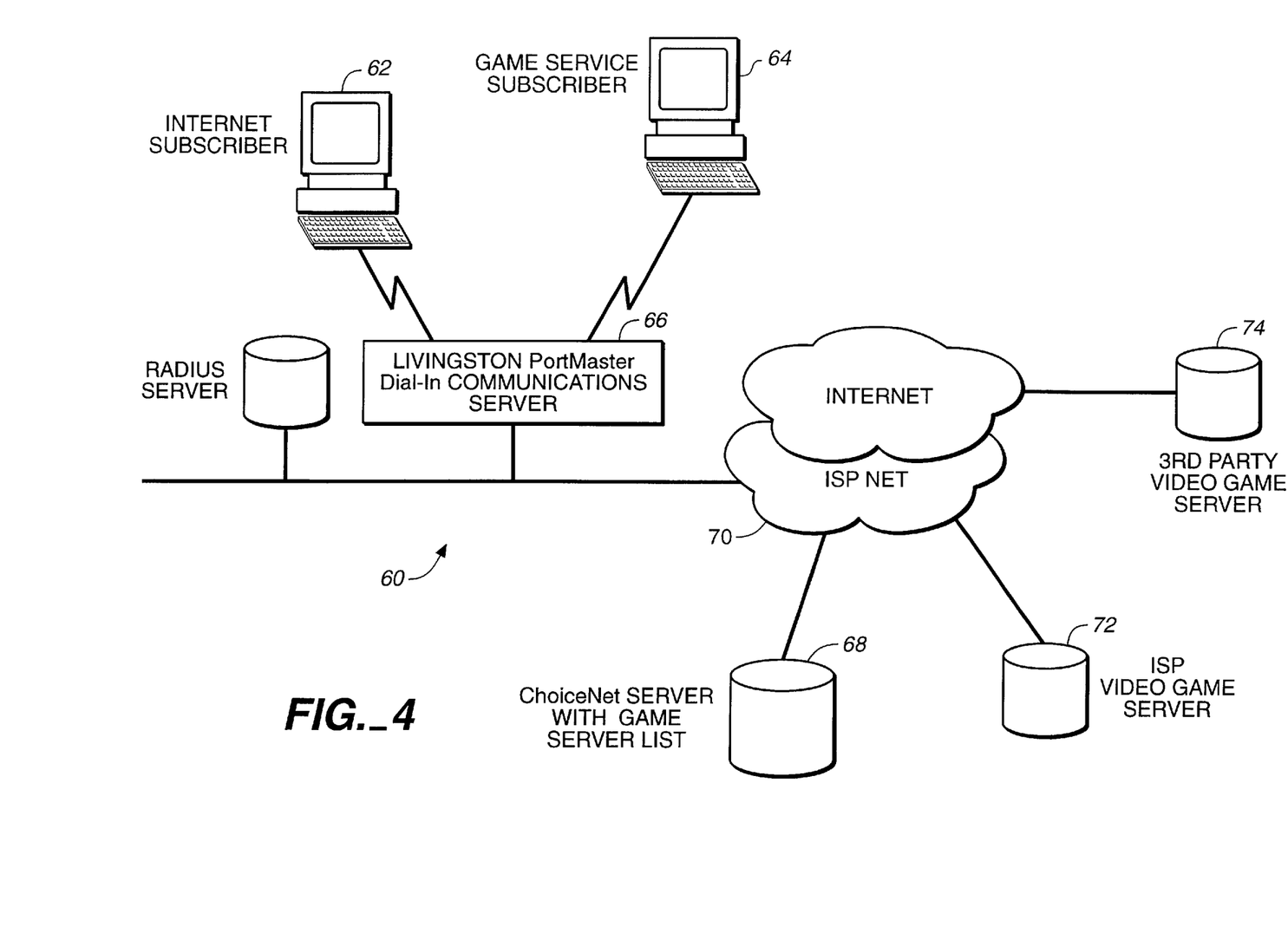
FIG. 4 is a block diagram of a second embodiment of an Internet access system employing the invention.

In addition to controlling access by a user to sites based on the nature of their content, the system and process of the invention can also be used, for example, by an Internet Service Provider to control access by users to certain value added services, such as a game service. When a game subscriber logs in, a user filter can be used to permit access to a game server, while allowing the ISP to deny access to non-subscribers. Similarly, an ISP can allow users who log in with a predetermined name, such as VIPguest, access using the system and process of this invention to certain sites of a manufacturer intended for use of its customers, such as product information and customer service sites. FIG. 4 shows a network access control system 60 that is used by an ISP to provide a video game service. Subscriber 62 utilizes the ISP, but is not a subscriber to the game service. Subscriber 64 is a subscriber to the game service. Both access the ISP through communications server 66. The server communications server 66 and access server 68 are connected in ISP network 70, along with an ISP video game server 72. A third party video game server 74 is accessible through the ISP network on Internet 76. The communications server 66 authorizes a requested access by subscriber 64 to the game servers 72 and 74 and denies access to those servers to subscriber 62 in the same manner as the communications server 14 in the FIGS. 1–3 embodiment. Other than as shown and described, the construction and operation of the FIG. 4 embodiment is the same as that of the FIGS. 1–3 embodiment.

Figure 5:
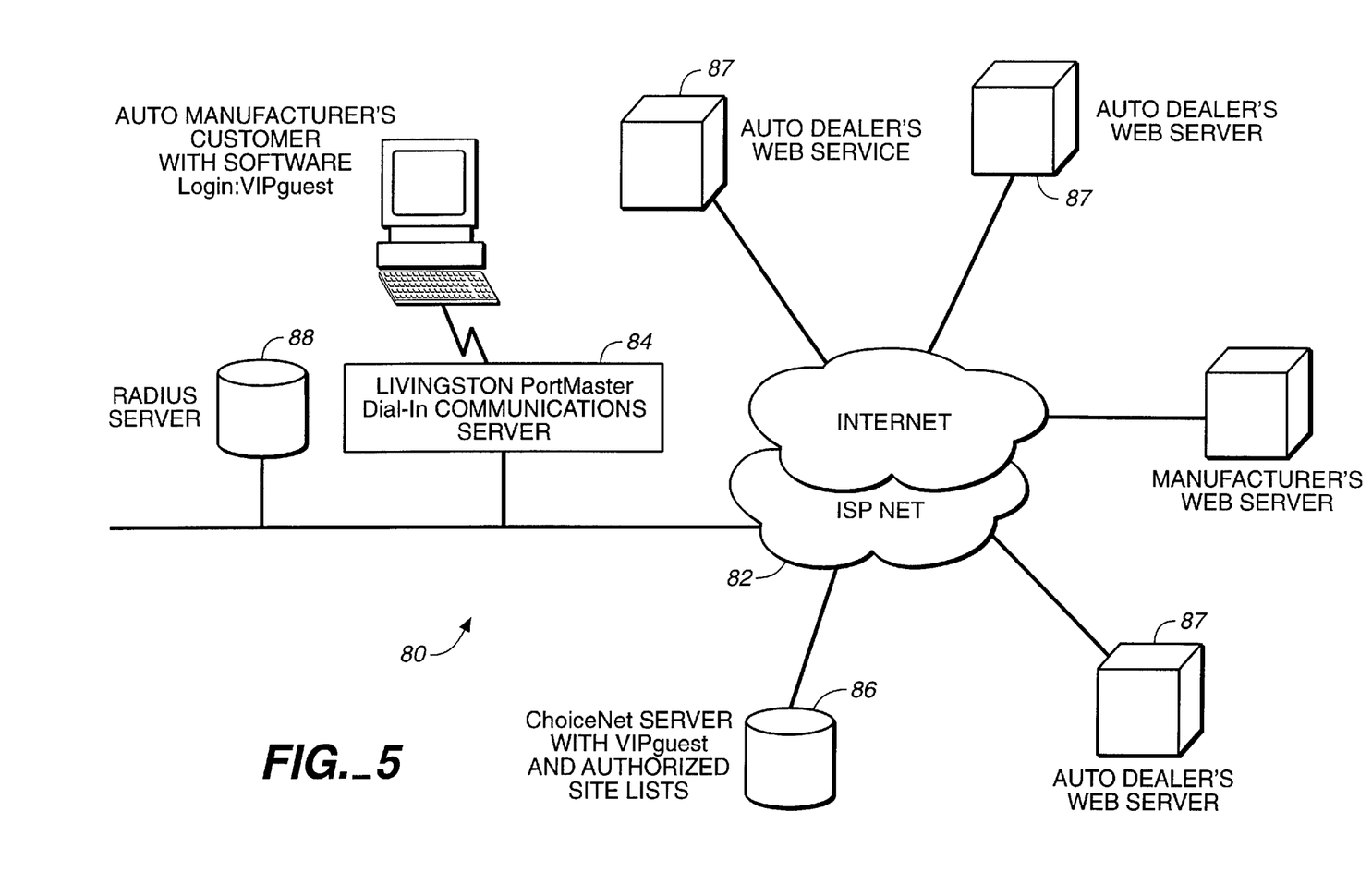
FIG. 5 is a block diagram of a third embodiment of an Internet access system employing the invention.

FIG. 5 shows a network control access system 80 with which an ISP can work with a customer of the ISP, in this example an auto manufacturer, by allowing the auto manufacturer to provide Internet access software for accessing certain of its sites with a unique log in name, such as VIPguest. When the manufacturer's clients dial into network 82 and log in as VIPguest, a network access filter can be downloaded to communications server 84 from access server 86 which only permits visibility to the predefined auto dealer sites 87. In this way, the auto manufacturer can provide special sales and marketing services without any investment in their own network and dial-in numbers. The ISP can offer this service using its existing infrastructure. The ISP can use its RADIUS server 88 accounting and billing to charge the auto manufacturer for access through the network 82. Other than as shown and described, the construction and operation of the FIG. 5 embodiment is the same as that of the FIGS. 1–4 embodiments.

It should now be readily apparent to those skilled in the art that a novel system and process for controlling network access capable of achieving the stated objects of the invention has been provided. The system and process for network access control allows customized Internet content monitoring based on a centralized permit model. The system and process is readily implemented using hardware that is typically present in most installations for Internet access. The system and process utilizes an extension of firewall filtering to implement the content monitoring.

It should further be apparent to those skilled in the art that various changes in form and details of the invention as shown and described may be made. It is intended that such changes be included within the spirit and scope of the claims appended hereto.

What is claimed is:

1. A system for controlling network access, comprising:
    (a) a local access server having a local cache for storage of recently used user filters and sites accessible from a system for which access has been recently requested;
    (b) a network access server coupled to said local access server and having storage for user filters and a list of permitted sites, wherein said network access server automatically maintains and compiles said list of permitted sites;
    (c) access client software resident in said local access server for using said recently used user filters and sites for which access has been requested in said local cache for making an access determination for a site to which a user requests access and for communicating with said network access server to obtain an access determination from said user filters and said list of permitted sites stored at said network access server if an access determination cannot be made from said recently used user filters and sites stored in said local cache.

2. The system of claim 1 in which said access client software is configured to identify said sites for which access is requested from addresses in information packets requesting the accesses.

3. The system of claim 1 additionally comprising:
    (d) a user authentication and authorization server coupled to said local access server and having storage for user profiles including user passwords and identifications of said user filters for determining site access, said local access server additionally including user authentication and authorization client software resident therein, said user authentication and authorization client software being configured to communicate with said user authentication and authorization server when said user logs into said network access server and to supply user filter identifications to said access client software.

4. The system of claim 1 in which user requests for access are transmitted as Internet Protocol packets having headers with addresses and said access client software is configured to use said addresses to find a requested site in said list of permitted sites for determining whether access to said requested site will be granted.

5. The system of claim 1, wherein said network access server further comprises server software that automatically maintains said list of permitted sites by downloading updated versions of said list over the Internet and compiling said list for use by said access client software.

6. The system of claim 1, wherein said list of permitted sites is updated on a periodic basis.

7. The system of claim 1, wherein said recently used user filters and said sites for which access has been requested in said local cache is automatically updated based on said access determination.

8. A process for controlling network access in a system of interconnected networks, which comprises:
    (a) defining user access filters for determining if a request by a user for access to a desired site in the system should be permitted;
    (b) storing in a cache local to an access server recently used user access filters and sites accessible from the system for which access has been requested;
    (c) storing user filters and a list of permitted sites at a network access server coupled to the local access server;
    (d) automatically maintaining and compiling said list of permitted sites at said network access server;
    (e) attempting to use said user filters and said sites for which access has been requested in said local cache for making an access determination for a site to which a user requests access; and
    (f) using at least one of said user filters and said list of permitted sites stored at said network access server to obtain an access determination if an access determination cannot be made from said recently used user filters and said sites stored in said local cache.

9. The process of claim 8 wherein sites for which access is requested are identified from addresses in information packets requesting access.

10. The process of claim 8 wherein a user authentication and authorization server supplies user filter identifications to said local access server.

11. The process of claim 8 wherein user requests for access are transmitted as Internet Protocol packets having headers with addresses and said addresses are used to find a requested site in said list of permitted sites for determining whether access to said requested site will be granted.

12. The process of claim 8, wherein step (d) comprises the step of automatically maintaining said list of permitted sites by downloading updated versions of said list over the Internet and compiling said list for use by client software resident in said local access server.

13. The process of claim 8, wherein step (d) further comprises the step of updating said list of permitted sites on a periodic basis.

14. A storage medium having stored therein a program, which when executed on a network data processing system, will control user access to sites accessible in a network of networks by:
   (a) defining user access filters for determining if a request by a user for access to a desired site in the system should be permitted;
   (b) storing in a cache local to an access server recently used user access filters and sites accessible from the system for which access has been requested;
   (c) storing user filters and a list of permitted sites at a network access server coupled to the local access server;
   (d) automatically maintaining and compiling said list of permitted sites at said network access server;
   (e) attempting to use said user filters and said sites for which access has been requested in said local cache for making an access determination for a site to which a user requests access; and
   (f) using at least one of said user filters and said list of permitted sites stored at said network access server to obtain an access determination if an access determination cannot be made from said recently used user filters and said sites stored in said local cache.

15. The storage medium of claim 14 in which the program is configured to identify sites for which access is requested from addresses in information packets requesting the accesses.

16. The storage medium of claim 14 in which the program is configured to utilize a user authentication and authorization server to supply user filter identifications to said access server.

17. The storage medium of claim 14 in which the program is configured to receive user requests for access as Internet Protocol packets having headers with addresses and the program is further configured to utilize said addresses to find a requested site in said list of permitted sites for determining whether access to said requested site will be granted.

18. The storage medium of claim 14, wherein the program is further configured to automatically maintain said list of permitted sites by downloading updated versions of said list over the Internet and to compile said list for use by client software resident in said local access server.

19. A system for controlling a user's access to a network, comprising:
   a network access server, coupled to the network, having storage for user filters and a list of permitted sites;
   network access server software implemented on said network access server that is configured to automatically maintain said list of permitted sites by downloading updated versions of said list over the Internet and to compile said list;
   a local access server, coupled to said network access server, having a local cache for storage of recently used user filters and sites for which access has been previously requested; and
   client access server software, resident in said local access server, that is configured to make an access determination for a desired site to which a user requests access by checking in said local cache for said recently used user filters and said sites for which access has been previously requested, and by communicating with said network access server to obtain an access determination from said user filters and said list of permitted sites if an access determination cannot be made from said recently used user filters and said sites stored in said local cache.

20. The system of claim 19, further comprising:
   a user authentication and authorization server, coupled to said local access server, having storage for user profiles including user passwords and identifications of said user filters for determining site access; and
   user authentication and authorization client software, resident in said local access server, that is configured to communicate with said user authentication and authorization server when said user logs into said network access server, and to supply user filter identifications to said client access server software.

21. In a system of interconnected networks comprising a plurality of potentially accessible sites, a method of controlling a user's access to a network, the network comprising a local access server having a local cache and a network access server, comprising the steps of:
   (a) defining user access filters for determining if a request by the user for access to a desired site in the system should be permitted;
   (b) storing said user access filters and a list of permitted sites at the network access server, said list of permitted sites being automatically maintained and compiled by said network access server;
   (c) storing recently used user access filters and previously requested sites in the local cache;
   (d) making an access determination for said desired site based on said recently used user access filters and said previously requested sites stored in the local cache; and
   (e) if an access determination cannot be made in step (d), making an access determination for said desired site based on said user filters and said list of permitted sites stored at the network access server.

22. The method of claim 21, wherein the network further comprises a user authentication and authorization server, the method further comprising the step of:
   (f) supplying the local cache with user filters from the user authentication and authorization server.

23. The method of claim 21, wherein step (b) comprises the steps of:
   storing said user access filters and a list of permitted sites at the network access server, said list of permitted sites being automatically maintained by periodically downloading updated versions of said list over the Internet; and
   compiling said list for use by client software resident in the local access server.

* * * * *